(12) United States Patent
Phillips et al.

(10) Patent No.: US 7,643,271 B2
(45) Date of Patent: Jan. 5, 2010

(54) ELECTRICAL JUNCTION BOX FOR TRACTOR TRAILER

(75) Inventors: William A. Phillips, Rossmoor, CA (US); Oscar A. Puluc, Downey, CA (US); Patrick E. Lewis, Tustin, CA (US); John D. Jacobs, Brea, CA (US); Adam B. Bean, Duarte, CA (US)

(73) Assignee: R.A. Phillips Industries, Inc. CA (US)

( * ) Notice: Subject to any disclaimer, the term of this patent is extended or adjusted under 35 U.S.C. 154(b) by 0 days.

(21) Appl. No.: 12/025,329

(22) Filed: Feb. 4, 2008

(65) Prior Publication Data

US 2009/0195971 A1 Aug. 6, 2009

(51) Int. Cl.
*H02B 1/04* (2006.01)
(52) U.S. Cl. ..................................................... 361/643
(58) Field of Classification Search ................. 361/643; 340/431; 439/38–39, 35; 364/900, 424
See application file for complete search history.

(56) References Cited

U.S. PATENT DOCUMENTS

| | | | | |
|---|---|---|---|---|
| 5,488,352 | A | * | 1/1996 | Jasper ......................... 340/431 |
| 5,739,592 | A | * | 4/1998 | Rigsby et al. ................. 307/9.1 |
| 6,130,487 | A | * | 10/2000 | Bertalan et al. .............. 307/9.1 |
| 6,547,599 | B2 | | 4/2003 | Kinsey et al. |
| 6,558,167 | B2 | * | 5/2003 | Harmon et al. ............... 439/35 |
| 6,743,025 | B2 | | 6/2004 | Howard |

OTHER PUBLICATIONS

Printout from Cole Hersee Company website at www.colehersee.com; webpage listed under Product Catalog—Circuit Protection—Brackets—Part No. 30090-2; printed Feb. 4, 2008.
Printout from Cole Hersee Company website at www.colehersee.com; webpage listed under Product Catalog—Circuit Protection—Circuit Breakers—Part No. 30055-10; printed Feb. 4, 2008.
Press release entitled "New Ultra-Box Tackles Trucking Future Lighting, Electronic Demands", Oct. 29, 2007, downloaded from Grote Industries website at http://www.grote.com/new/000138.html.
Tramec Catalog, pp. 32-35, downloaded from www.tramec.com on Mar. 4, 2008.
Picture of Grote Industries Ultra-Box copied on Jun. 2, 2008 from Fleet Equipment Magazine web page at http://news.fleetequipmentmag.com/?type+art&id=85304.

\* cited by examiner

*Primary Examiner*—Jean F Duverne
(74) *Attorney, Agent, or Firm*—Dickstein Shapiro LLP

(57) ABSTRACT

An electrical junction box is configured to be attached to a vehicle. The box includes a container that has a front opening and a cavity located behind the front opening. A cover is movably attached to the container, so it can be moved into a closed position covering the front opening. A socket, to which an electrical supply cable can be removably connected, is fixed to the container beside the front opening. Breakers are secured to the container within the cavity. Each breaker has an input terminal and an output terminal. Each input terminal is electrically connected to the supply cable via the socket. Electrical distribution lines connect the breakers' output terminals to components of the vehicle that are outside the cavity.

18 Claims, 5 Drawing Sheets

ELECTRICAL JUNCTION BOX FOR TRACTOR TRAILER

TECHNICAL FIELD

The application relates to electrical junction boxes, especially for tractor trailer rigs.

BACKGROUND

A tractor trailer rig includes two vehicles: a tractor in which a driver sits, and a trailer pulled by the tractor. A supply cable extends from the tractor to a junction box connected to the front of the trailer. The supply cable includes electrical supply lines that conduct electricity from the tractor to respective breakers in the junction box. Distribution lines extend from the box into the trailer. They conduct electricity from the respective breakers to different devices of the trailer, such as a dome light and a brake system.

SUMMARY

An electrical junction box is configured to be attached to a vehicle. The box includes a container that has a front opening and a cavity located behind the front opening. A cover is movably attached to the container, so it can be moved into a closed position covering the front opening. A socket, to which an electrical supply cable can be removably connected, is fixed to the container beside the front opening. Breakers are secured to the container within the cavity. Each breaker has an input terminal and an output terminal. Each input terminal is electrically connected to the supply cable via the socket. Electrical distribution lines connect the breakers' output terminals to components of the vehicle that are outside the cavity.

Preferably, the socket is secured to a side panel of the container. The side panel is located beside the front opening and in front of the cavity. The cover is pivotally attached to the container by a hinge. The hinge is located across the front opening from the socket. The breakers are removably secured to the container in an orientation in which the terminals of each breaker project toward the opening. Each breaker includes a breaker body from which both of the breaker's terminals project. The container includes a breaker-securing structure configured to removably and frictionally grasp the breaker bodies. A control module is removably secured, within the cavity, to the container. The module controls distribution of electricity through the least one of the distribution lines. A memory module is attached to the box and configured to store repair-related information regarding the vehicle.

DETAILED DESCRIPTION

The drawings and the following description provide examples of the elements recited in the claims. These examples enable a person of ordinary skill in the art to make and use the invention, including best mode, without implying limitations not recited in the claims.

Junction Box

Figure 1:
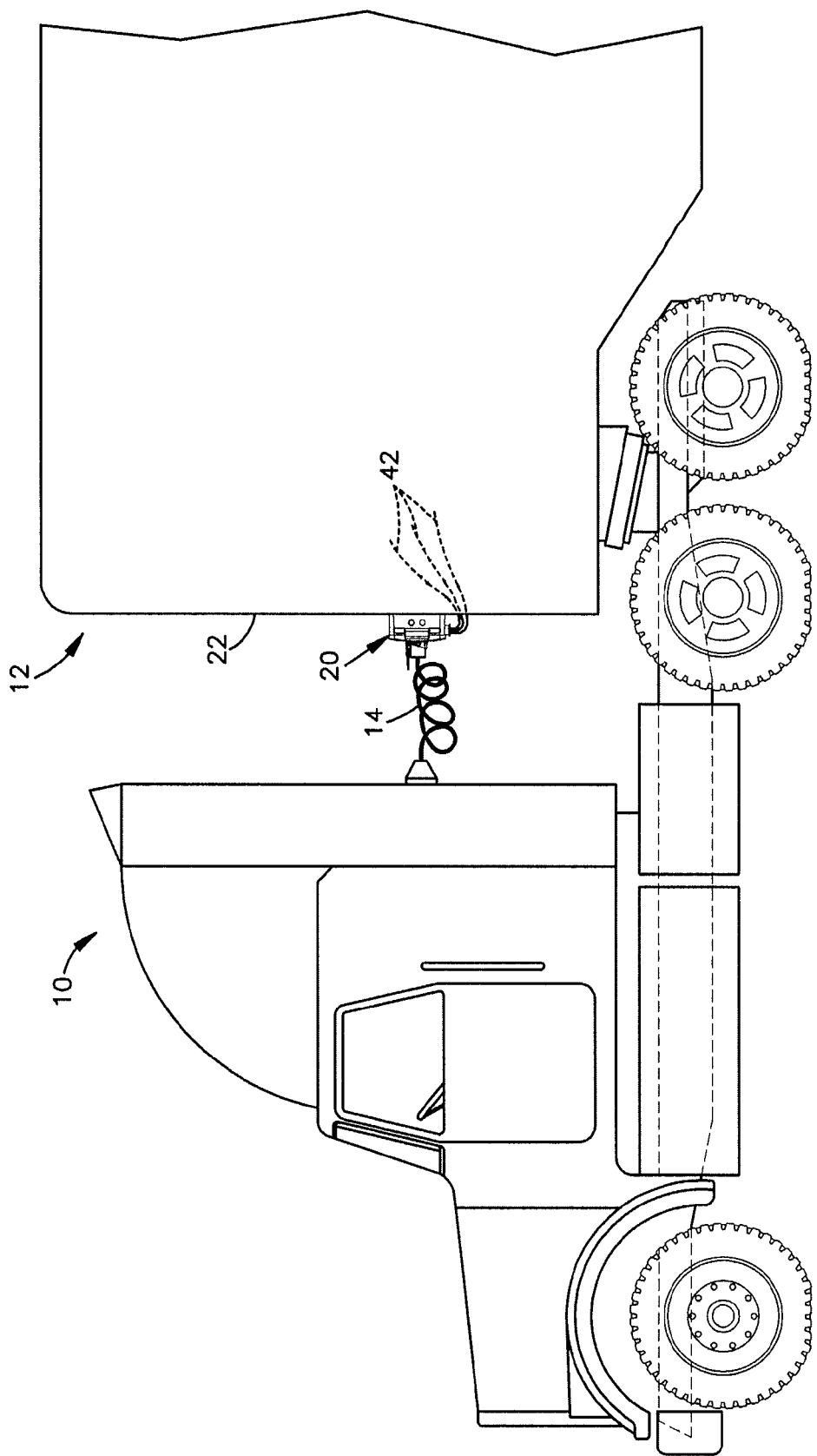
FIG. 1 is a schematic view of a tractor trailer rig.

FIG. 1 shows a tractor trailer rig, which includes a tractor 10 and a trailer 12. An electrical supply cable 14 extends from the tractor 10 to a junction box 20 mounted on a front wall 22 of the trailer 12. Electrical distribution lines 42 extend from the junction box 20 to different components of the trailer 12, such as ABS brakes, dome light, and electrical lift gate.

Figure 2:
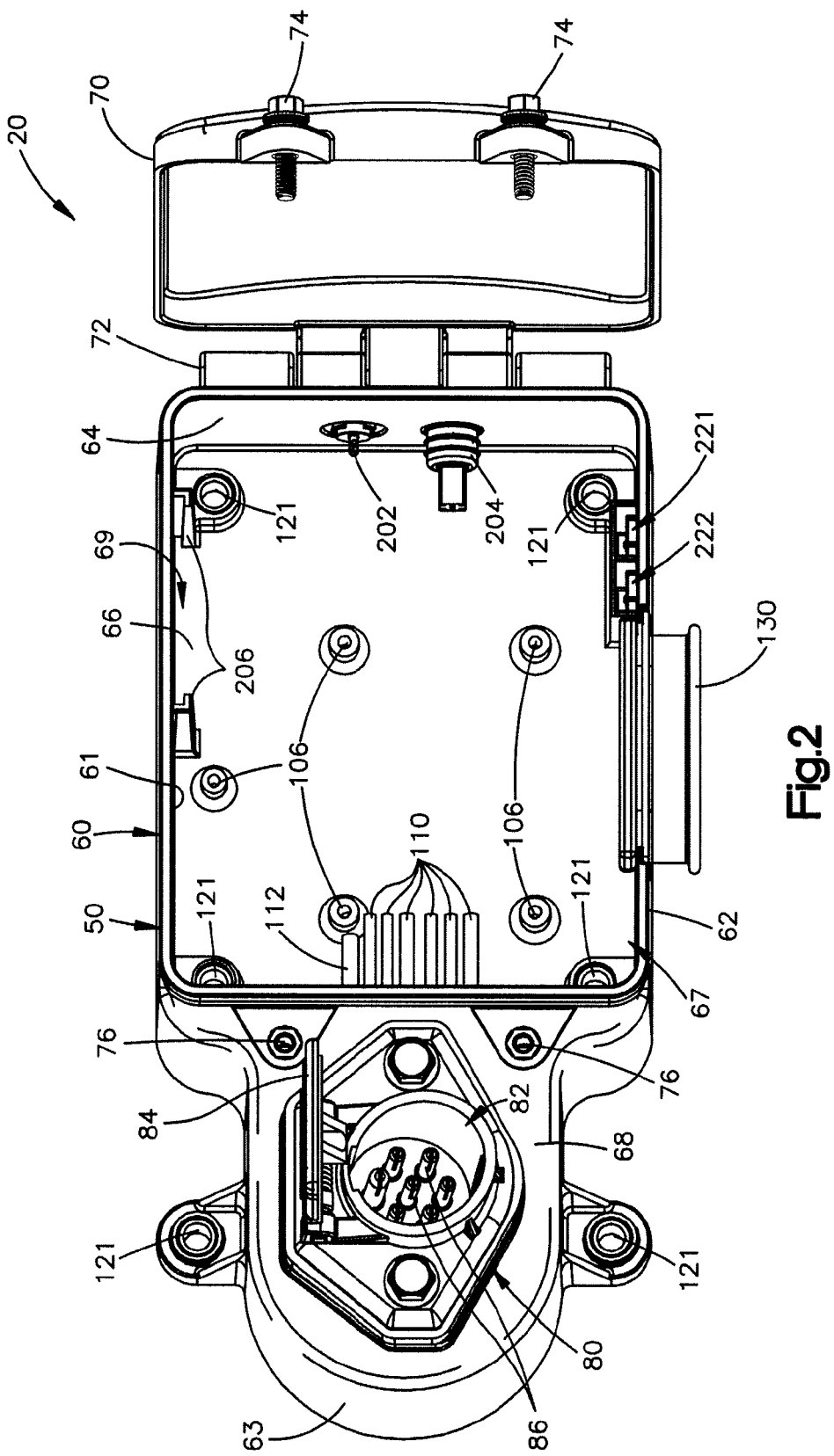
FIG. 2 is a perspective view of a junction box of the rig.

As shown in FIG. 2, the junction box 20 includes a plastic container 50. The container 50 has a sidewall 60 with upper and lower wall sections 61 and 62 and left and right wall sections 63 and 64. The container 50 further has a rear wall 66, a front opening 67 and a front panel 68 beside the front opening 67. A cavity 69 is located behind the front opening 67 and the front panel 68, and is bounded by the sidewall 60, the front panel 68 and the rear wall 66. Directional terms used herein, such as upper, lower, left and right are designated with respect to the box's orientation shown in the figures.

A plastic cover door 70 is pivotally attached to the container 50 by a hinge 72 attached to the right side wall 64. The door 70 can be pivoted about the hinge 72 into a closed position covering the front opening 67. The door 70 has a gasket along its edge that seals against the container 50 to prevent moisture from entering the cavity 69. The door 70 can be fastened shut by two screws 74 that extend through two through-holes in the distal end of the door 70 and into two threaded holes 76 in the box's front panel 68.

A socket 80 is fixed in the front panel 68 beside the front opening 67. The socket 80 is located across the front opening 67 from the hinge 72. The socket 80 has a cavity 82, a cover door 84 that is spring-biased to cover the cavity 82, and seven electrical terminals 86 within the cavity 82.

The supply cable 14 (FIG. 1) in this example has seven electrical supply lines, comprising one ground line and six hot lines for individually powering different components of the trailer 12. Plugging the supply line 14 into the socket 80 connects each supply line to a respective socket terminal 86.

Figure 3:
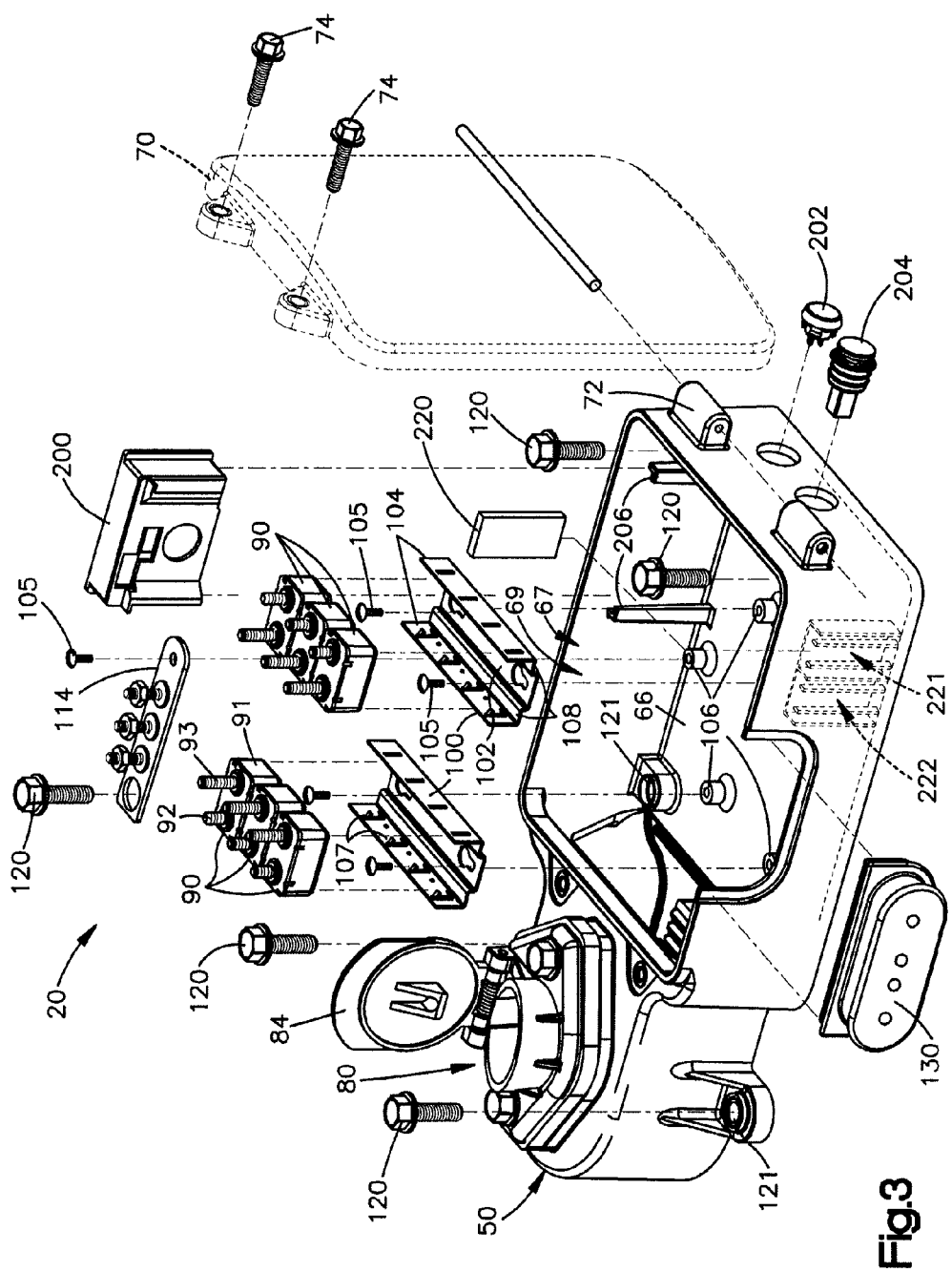
FIG. 3 is an exploded perspective view of the box and its components.
Figure 4:
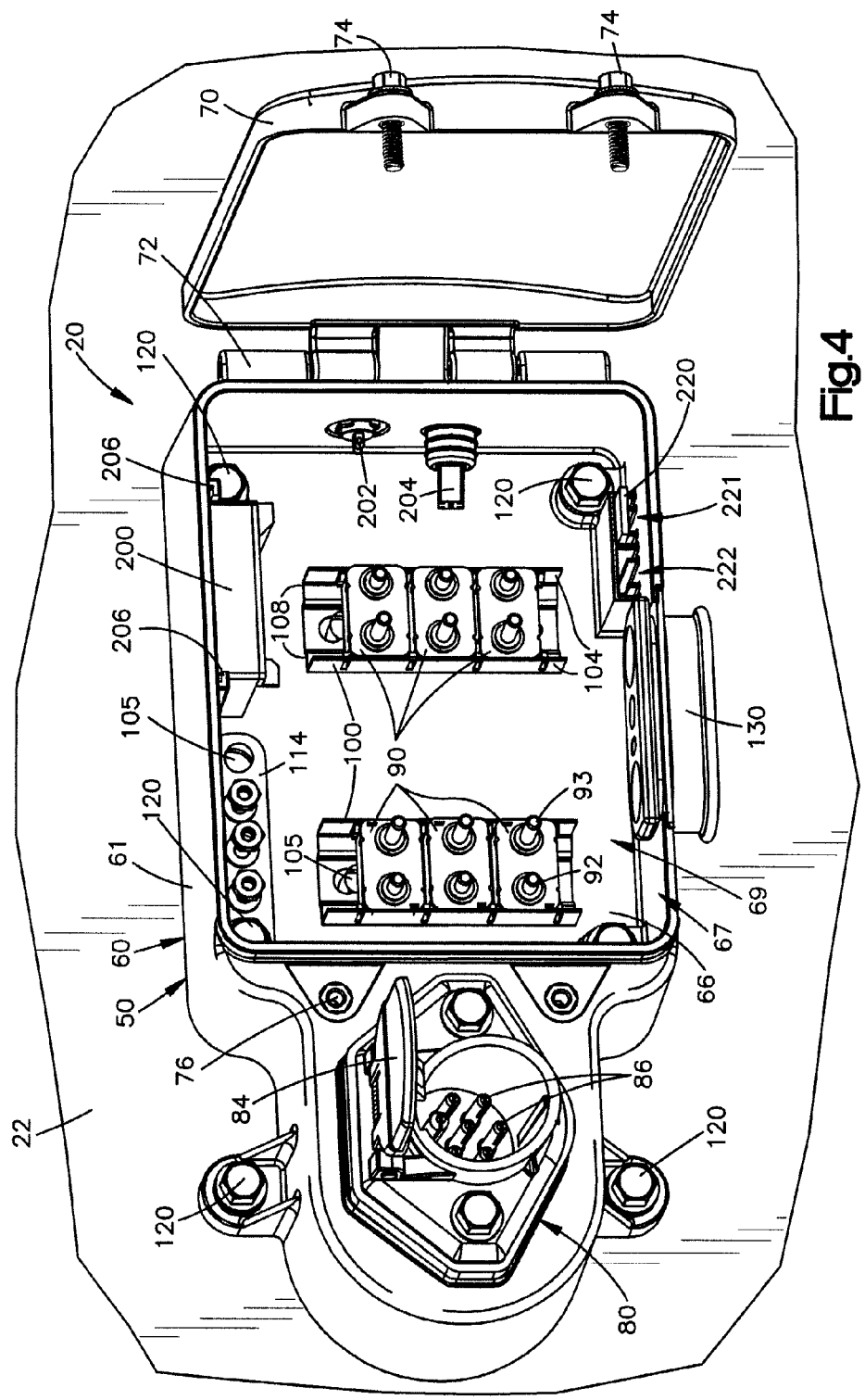
FIG. 4 is an assembled perspective view of the box and its components.

As shown in FIGS. 3-4, the box 20 houses six breakers 90. The breakers 90 can be manually resettable, automatically resettable, or needing replacement when tripped. Each breaker 90 includes a breaker body 91 and two terminals—in this example designated input (or hot-side) terminal 92 and output (or cold-side) terminal 93. Both terminals 92, 93 are threaded lugs that project from the breaker body toward the opening 67.

The breakers 90 are located entirely in the cavity 69 and secured to the box 20 by left and right clips 100. Each clip 100 is formed of spring steel that is bent to form a rear section 102 and two opposite side sections 104. The clip's rear section 102 is fastened by screws 105 to bosses 106 in the rear wall 66. The bosses 106 space the clips 100 from the rear wall 66. The side sections 104 of each clip 100 elastically grasp three breakers 90 and frictionally hold the breakers 90 by their bodies 91. The breakers 90 are thus not held in place by their terminals 92, 93. Each breaker 90 is captured by and between prongs 107. The prongs 107 project inward from the side sections 104 and separate adjacent breakers 90 from each other. Each clip 100 has two raised ledges 108 at opposite sides of the bolts 105, which space the breakers 90 above the screws 105.

The box 20 is fastened to the trailer's front wall 22 by mounting screws 120. The screws 120 extend through metal-reinforced mounting holes 121 of the container 50 and into the trailer's front wall 22.

Figure 5:
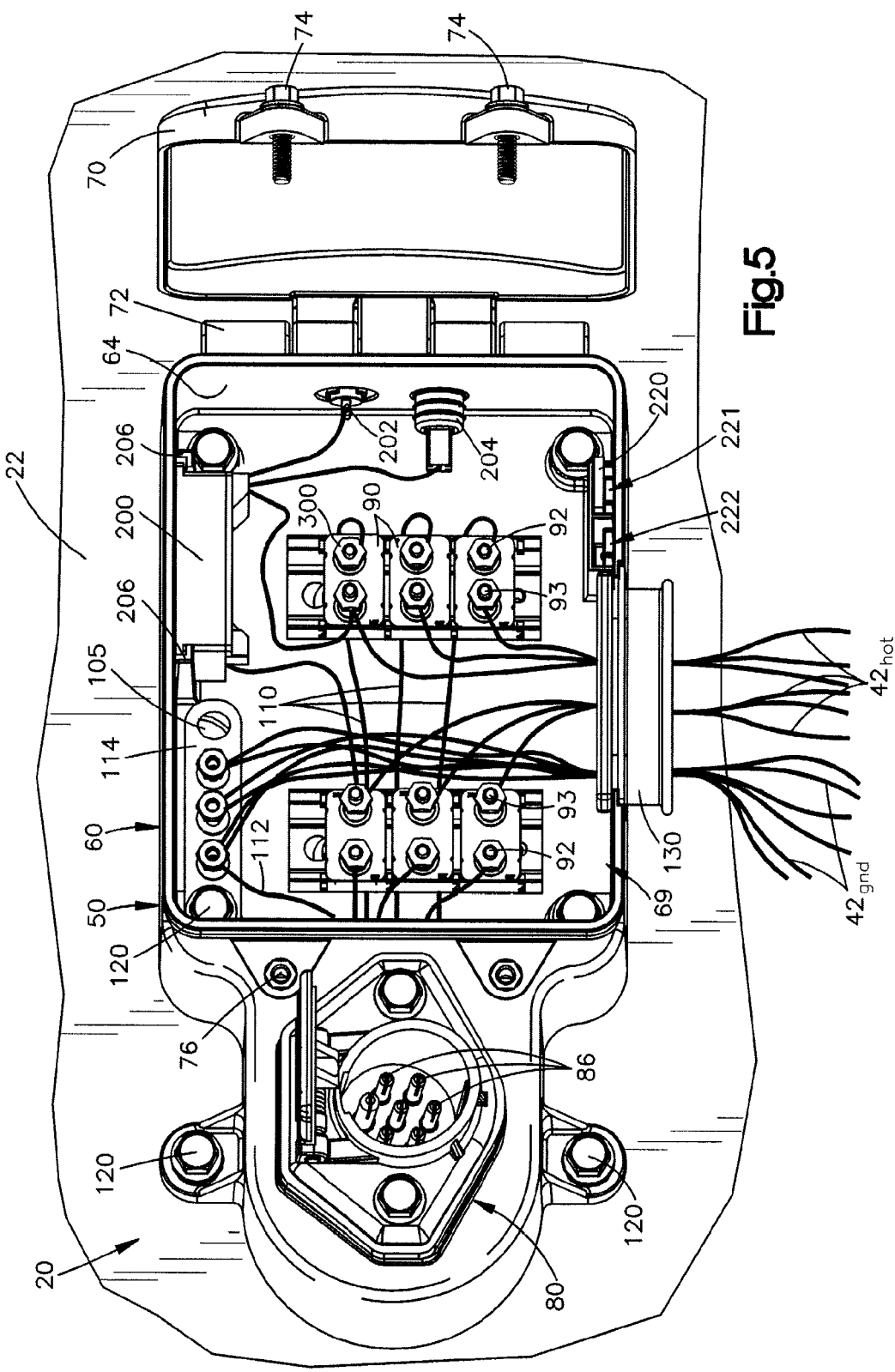
FIG. 5 is a view similar to FIG. 4, showing electrical connections between the components.

The box 20 is wired as shown in FIG. 5. Six electrical supply jumpers 110 respectively connect the socket's six hot terminals 86 to the six breaker input terminals 92. Some of these jumpers 110 extend under the breaker clips 100 to reach the input terminals 92. A ground supply jumper 112 connects the socket's ground terminal 86 to a ground strip 114. One end of the ground strip 114 is fastened by a screw 105 to one of the bosses 106 (FIG. 3). The other end of the ground strip 114 receives a screw 120 that extends through one of the mounting holes 121 (FIG. 3) and into the trailer's front wall 22. A steel grommet (visible in FIG. 3) that lines and reinforces the mounting hole 121 also electrically shorts the ground strip 114 to the trailer's front wall 22.

The electrical distribution lines 42 (mentioned above with reference to FIG. 1) include six hot distribution lines $42_{hot}$ and six ground distribution lines $42_{gnd}$. The six hot lines $42_{hot}$ extend respectively from the six breakers' output terminals 93. The six ground lines $42_{gnd}$ extend from the ground strip 114. All twelve distribution lines $42_{hot}$ and $42_{gnd}$ extend through a grommet 130 in the bottom wall 62 to different trailer components that are located outside the box's cavity 69. The grommet 130 can be configured to provide a watertight seal around the distribution lines.

Control Module

In this example, some of the six distribution lines 42 are interrupted by an optional control module 200. This module 200 switches on/off the power conducted through the distribution lines 42 in accordance with a control scheme. The control scheme can be based on activation of the brake pedal and the tractor's battery charge. The module 200 is electrically connected to a switch 202 and an indicator light 204, both mounted in the container's right sidewall 64. When the switch 202 is pressed, the control module 200 lights the indicator light 204 with a color that indicates a status of the trailer's electrical system. For example, green can indicate no problem, red can indicate depleting battery charge, and yellow can indicate some other problem.

The control module 200 is captured by and between two forward-extending guide rails 206 adjoining the top wall 61. The module 200 can be replaced when it is broken or needs to be updated. For example, it can be replaced with a new control module having an updated control scheme. This requires sliding the old module 200 out of the guide rails 206 and sliding the new module in.

Memory Module

A memory module 220 is located in the cavity 69. It is configured to store service-related information for the rig's tractor 10 and/or trailer 12. The information can be, for example, warrantee information (e.g., for tires and battery), part specifications (e.g., for battery and tires), and/or service history (e.g., oil change, tire rotation, part repair and part replacement).

The memory module 220 is permanently glued into a pocket 221 of the container 50. The pocket 221 is configured, in size and shape, to contain the module 220. The container 50 has a second pocket 222 to receive a second memory module. The second memory module might be needed in case the first memory module breaks, or to store a different type of service information than the first module stores. A repairman can connect the memory module 220 to a computer using a cable, to upload and download service-related information to and from the computer.

In an alternative embodiment, the memory module 220 is attached removably to the container 50. It can then be withdrawn from the cavity 69 and taken to the repairman's computer without taking the computer to the junction box 20.

Procedure to Replace a Breaker

A user or repairman can replace a breaker 90 by the following steps performed in the following order: 1) Swing the door 70 open. 2) Unscrew the nuts 300 from the two lugs 92, 93 of the breaker 90. 3) Remove the supply jumper 110 and distribution line 42 from the lugs 92, 93. 4) Pull the breaker 90 out of clip 100. 5) Push a replacement breaker 90 into the clip 100. 6) Replace the supply jumper 110 and the distribution line $42_{hot}$ onto the lugs 92, 93 of the new breaker 90. 7) Secure the jumper 110 and the line $42_{hot}$ in place with the nuts 300.

Steps 2-3 and 6-7, entailing removing/replacing the nuts, jumper and line to/from the lugs can be done without dislodging the breaker while the lugs, nuts, jumper and line are in full view of the user (or repairman). That is because the lugs 92, 93 project toward the user with no obstruction in-between.

Steps 4-5, entailing removing/inserting a breaker 90, do not require an unscrewing or unlatching step. That is because the breakers 90 are secured only by friction and are unobstructed from the user.

During this procedure, view of the socket 80 and breakers 90 is not interrupted by the door 70. That is because the hinge 72 is at the opposite side of the front opening 67 from the socket 80. The door 70, when opened, is thus farther from the socket 80 than if the hinge 72 were above or below the front opening 67. Also, since the door 70 swings away from the socket 80 when opened, the door 70 cannot obstruct or interfere with the socket 80 or the supply cable 14 (FIG. 1).

While the repairman is working on the breakers 90 in the box 20, the repairman can replace the control module 200 and can access the memory module 220 to upload/download service-related information.

The scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims. For example, the box can be used on vehicles other than rigs, and even on non-vehicle structures.

The invention claimed is:

1. An electrical junction box apparatus configured to be attached to a vehicle, comprising:
    a container including a front opening and a cavity located behind the front opening;
    a cover movably attached to the container, to be moved into a closed position covering the front opening;
    a socket fixed to the container beside the front opening, to which an electrical supply cable can be removably connected;
    breakers that are secured to the container within the cavity, each breaker having an input terminal and an output terminal, each input terminal being electrically connected to the supply cable via the socket; and
    electrical distribution lines, each connecting a respective one of the breaker output terminals to a component, of the vehicle, that is outside the cavity;
    wherein each breaker includes a breaker body from which both of the breaker's terminals project, and the container includes a breaker-securing structure configured to removably and frictionally grasp the breaker bodies.

2. The apparatus of claim 1 further comprising a side panel in which the socket is secured, the side panel being located beside the front opening and in front of the cavity.

3. The apparatus of claim 1 further comprising a hinge by which the cover is pivotally attached to the container, the hinge being located across the front opening from the socket.

4. The apparatus of claim 1 wherein the breakers are removably secured to the container in an orientation in which the terminals of each breaker projects toward the opening.

5. The apparatus of claim 1 further comprising a control module removably secured to the container, located within the cavity, and configured to control distribution of electricity through at least one of the distribution lines.

6. The apparatus of claim 1 further comprising a memory module attached to the box and configured to store repair-related information regarding the vehicle.

7. The apparatus of claim 1 wherein the memory module is inside the cavity.

8. The apparatus of claim 1 wherein the container includes a pocket configured to hold the memory module.

9. The apparatus of claim 1 wherein the memory module is permanently secured to the container.

10. The apparatus of claim 1 further including a cable by which the memory module is configured to be connected to a computer for uploading the information to the computer.

11. The apparatus of claim 1 wherein the memory module is removable by a user from the cavity, to be connected to a computer for communicating the repair-related information with the computer.

12. The apparatus of claim 1 wherein the service-related information is warrantee information for the vehicle.

13. The apparatus of claim 1 wherein the service-related information is repair history information for the vehicle.

14. The apparatus of claim 1 wherein the service-related information is part specification information for the vehicle.

15. An electrical junction box apparatus configured to be attached to a vehicle, comprising:
   a container including a front opening and a cavity located behind the front opening;
   a cover movably attached to the container, to be moved into a closed position covering the front opening;
   breakers located in the cavity, each breaker having an input terminal and an output terminal;
   electrical supply wiring connected to the breaker input terminals;
   electrical distribution lines connecting the breaker output terminals to respective components of the vehicle outside the cavity; and
   a memory module held in the box and configured to store repair-related information regarding the vehicle;
   wherein each breaker includes a breaker body from which both of the breaker's terminals project, and the container includes a breaker-securing structure configured to removably and frictionally grasp the breaker bodies.

16. An electrical junction box apparatus configured to be attached to a vehicle, comprising:
   a container including a front opening and a cavity located behind the front opening;
   a cover movably attached to the container, to be moved into a closed position covering the front opening;
   breakers within the cavity, each having an input terminal and an output terminal projecting from a breaker body;
   electrical supply wiring connected to the breaker input terminals;
   electrical distribution lines connecting the breaker output terminals to respective components of the vehicle outside the cavity; and
   one or more clips that frictionally hold the bodies of the breakers in an orientation in which the terminals project toward the opening, with the breakers not being held in place by their terminals, such that the front opening provides access by a user to disconnect the supply wiring and the distribution lines from the terminals without dislodging the breakers.

17. The apparatus of claim 16 wherein each clip has prongs that project inward from opposites sides of the clip and separate adjacent breakers from each other.

18. The apparatus of claim 16 wherein each clip is fastened to the container by a fastener and has raised ledges at opposite sides of the fastener that space the breakers above the fastener.

* * * * *